United States Patent
Kako et al.

(10) Patent No.: US 8,051,641 B2
(45) Date of Patent: Nov. 8, 2011

(54) EXHAUST GAS PURIFYING APPARATUS FOR INTERNAL COMBUSTION ENGINE

(75) Inventors: Junichi Kako, Susono (JP); Shinichi Soejima, Gotemba (JP); Ryozo Kayama, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 867 days.

(21) Appl. No.: 11/991,740

(22) PCT Filed: Oct. 13, 2006

(86) PCT No.: PCT/JP2006/320460
§ 371 (c)(1),
(2), (4) Date: Mar. 10, 2008

(87) PCT Pub. No.: WO2007/046300
PCT Pub. Date: Apr. 26, 2007

(65) Prior Publication Data
US 2010/0047133 A1  Feb. 25, 2010

(30) Foreign Application Priority Data
Oct. 19, 2005  (JP) ................. 2005-304851

(51) Int. Cl.
*F01N 3/00*  (2006.01)

(52) U.S. Cl. ................. 60/285; 60/276; 60/277; 60/286

(58) Field of Classification Search ................. 60/274, 60/276, 277, 285, 286
See application file for complete search history.

(56) References Cited

U.S. PATENT DOCUMENTS

| | | | | |
|---|---|---|---|---|
| 5,600,948 A | * | 2/1997 | Nakajima et al. | 60/276 |
| 5,842,341 A | * | 12/1998 | Kibe | 60/274 |
| 6,691,507 B1 | * | 2/2004 | Meyer et al. | 60/285 |
| 6,935,100 B2 | * | 8/2005 | Miura | 60/284 |
| 7,350,350 B2 | * | 4/2008 | Okugawa et al. | 60/297 |
| 7,458,206 B2 | * | 12/2008 | Yahata et al. | 60/297 |
| 7,703,278 B2 | * | 4/2010 | Kobayashi et al. | 60/297 |
| 2005/0060990 A1 | | 3/2005 | Ueno et al. | |

FOREIGN PATENT DOCUMENTS

CN  1598256 A  3/2005
(Continued)

OTHER PUBLICATIONS

Office Action issued in Chinese Application No. 200680039277.9 issued on Sep. 4, 2009.

*Primary Examiner* — Binh Q Tran
(74) *Attorney, Agent, or Firm* — Oliff & Berridge, PLC

(57) ABSTRACT

The present invention has an object to provide an exhaust gas purifying apparatus for an internal combustion engine capable of obtaining accurate temperature information relating to a catalyst placed in an exhaust passage of the internal combustion engine. The degree of influence emthc of a catalyst inlet gas temperature and catalyst rear end temperature ethuf[end] is calculated (Step 102). An estimated value ethco of an outlet gas temperature is calculated by weighted averaging the inlet gas temperature and the catalyst rear end temperature ethuf[end] considering the degree of influence emthc (Step 104). A temperature correction coefficient ekthuf [x] for each region of the catalyst is calculated as a function f(emthc) of the degree of influence emthc (Step 108). A deviation between the outlet gas temperature estimated value ethco and a measured value of the outlet gas temperature is multiplied by the temperature correction coefficient ekthuf[x] to calculate an estimated value correction amount ecthuf[x] (Step 110). The estimated value correction amount ecthuf[x] is added to a catalyst temperature estimated value (Step 114).

22 Claims, 3 Drawing Sheets

FOREIGN PATENT DOCUMENTS

| | | |
|---|---|---|
| JP | A-10-068315 | 3/1998 |
| JP | A-10-159543 | 6/1998 |
| JP | A-10-196433 | 7/1998 |
| JP | A-2002-161793 | 6/2002 |
| JP | A-2003-336538 | 11/2003 |
| JP | A-2005-127285 | 5/2005 |

* cited by examiner

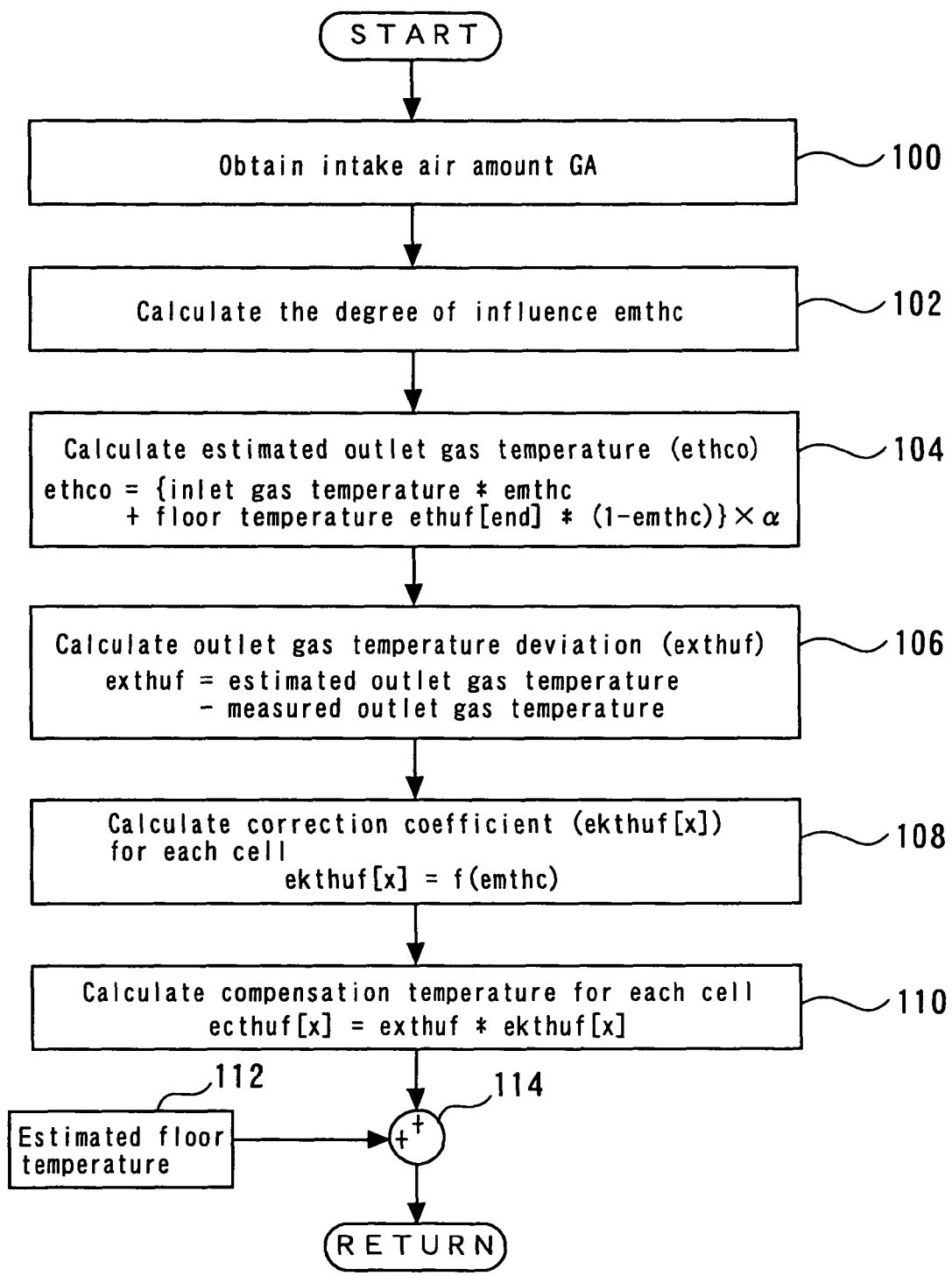

EXHAUST GAS PURIFYING APPARATUS FOR INTERNAL COMBUSTION ENGINE

TECHNICAL FIELD

The present invention relates to an exhaust gas purifying apparatus for an internal combustion engine, and more particularly to an exhaust gas purifying apparatus for an internal combustion engine suitable as a device for estimating a temperature of a catalyst placed in an exhaust passage of the internal combustion engine.

BACKGROUND ART

For example, Patent Document 1 discloses an exhaust gas purifying apparatus for an internal combustion engine including catalyst temperature estimation means for calculating a catalyst temperature estimated value of a catalyst placed in an exhaust passage based on an operation state of the internal combustion engine. In this conventional apparatus, an estimated value correction amount is calculated from a deviation between an estimated value and measured value of an exhaust gas temperature at a catalyst outlet (hereinafter referred to as an "outlet gas temperature"), and the estimated value correction amount is used to correct the catalyst temperature estimated value.

Including the above-mentioned document, the applicant is aware of the following document as a related art of the present invention.
[Patent Document 1] Japanese Laid-open Patent Application Publication No. 2003-336538
[Patent Document 2] Japanese Laid-open Patent Application Publication No. Hei 10-196433
[Patent Document 3] Japanese Laid-open Patent Application Publication No. 2005-127285
[Patent Document 4] Japanese Laid-open Patent Application Publication No. Hei 10-159543

DISCLOSURE OF INVENTION

A temperature relating to a catalyst such as the outlet gas temperature of the catalyst or a catalyst temperature (internal temperature) changes due to the influence of the catalyst temperature and also changes with changes in an exhaust gas temperature at a catalyst inlet (hereinafter referred to as an "inlet gas temperature") according to an operation state of an internal combustion engine. Thus, in order to more accurately estimate the temperature relating to a catalyst, it is preferable that the inlet gas temperature as well as the catalyst temperature is considered. However, in the conventional technique, there is no consideration on this point, and further studies are required for realizing a system capable of accurately obtaining the temperature relating to the catalyst.

The present invention is achieved in view of the above described problem, and has an object to provide an exhaust gas purifying apparatus for an internal combustion engine capable of obtaining accurate temperature information relating to a catalyst placed in an exhaust passage of the internal combustion engine.

The above object is achieved by an exhaust gas purifying apparatus for an internal combustion engine. A catalyst that is placed in an exhaust passage of the internal combustion engine is provided. An inlet gas temperature obtaining means is also provided for obtaining an inlet gas temperature of an exhaust gas at a catalyst inlet. A catalyst temperature estimating means is further provided for estimating a temperature of the catalyst. An outlet gas temperature estimating means is further provided for estimating the outlet gas temperature of the exhaust gas at a catalyst outlet considering degree of influence of the inlet gas temperature and catalyst temperature.

In a second aspect of the present invention, the outlet gas temperature estimating means may estimate a value, as the outlet gas temperature, which is obtained by multiplying a weighted average value between the inlet gas temperature and the catalyst temperature considering the degree of influence by a certain coefficient.

The third aspect of the present invention may include temperature correcting means for correcting an estimated value of the catalyst temperature estimated by the catalyst temperature estimating means and/or correcting an estimated value of the inlet gas temperature estimated by the inlet gas temperature obtaining means, on the basis of an estimated value of the outlet gas temperature estimated by the outlet gas temperature estimating means.

The fourth aspect of the present invention may include outlet gas temperature measuring means for measuring the outlet gas temperature. The temperature correcting means may correct the catalyst temperature estimated value and/or inlet gas temperature estimated value on the basis of the estimated value and measured value of the outlet gas temperature.

In a fifth aspect of the present invention, the catalyst temperature estimating means may estimate the catalyst temperature at each region of the catalyst divided into a plurality of parts. The temperature correcting means may dissimulate the catalyst temperature estimated value and/or the estimated value correction amount of the inlet gas temperature estimated value for each region of the catalyst by dissimulating the degree of influence for each region of the catalyst which includes or excludes the inlet portion of the catalyst.

In a sixth aspect of the present invention, the temperature correcting means may correct the estimated value correction amount at a region closer to the inlet of the catalyst largely than the estimated value correction amount at a region closer to the outlet of the catalyst when the influence of the inlet gas temperature is larger than the influence of the catalyst temperature at the region closer to the outlet of the catalyst.

In a seventh aspect of the present invention, the temperature correcting means may correct the estimated value correction amount at a region closer to the outlet of the catalyst largely than the estimated value correction amount at a region closer to the inlet of the catalyst when the influence of the catalyst temperature at the region closer to the outlet of the catalyst is larger than the influence of the inlet gas temperature.

In an eighth aspect of the present invention, the outlet gas temperature estimating means and/or temperature correcting means may further include influence degree changing means for changing the degree of influence on the basis of an operating state of the internal combustion engine.

In a ninth aspect of the present invention, the outlet gas temperature estimating means may further include coefficient changing means for changing the certain coefficient on the basis of an operating state of the internal combustion engine.

In a tenth aspect of the present invention, a parameter indicating the operating state may be at least one of an intake air amount, a crankshaft rotating speed, an intake pipe pressure, a throttle opening, and a load factor.

According to the first aspect of the present invention, the degree of influence of the inlet gas temperature and the catalyst temperature is considered to allow the outlet gas temperature to be accurately estimated.

According to the second aspect of the present invention, the value obtained by multiplying the weighted average value between the inlet gas temperature and the catalyst temperature considering the degree of influence by the certain coefficient is estimated as the outlet gas temperature, thereby allowing the outlet gas temperature to be accurately estimated.

According to the third aspect of the present invention, the estimated value of the catalyst temperature and/or the estimated value of the inlet gas temperature are corrected based on the outlet gas temperature estimated considering the degree of influence, thereby allowing the estimated values to be accurately obtained.

According to the fourth aspect of the present invention, the estimated value of the catalyst temperature and/or the estimated value of the inlet gas temperature are corrected based on the outlet gas temperature estimated considering the degree of influence and the measured value of the outlet gas temperature, thereby allowing the estimated values to be accurately obtained.

According to the fifth aspect of the present invention, the catalyst temperature at each region of the catalyst and/or the inlet gas temperature are corrected considering the degree of influence at each region, thereby allowing the catalyst temperature and the inlet gas temperature to be accurately corrected.

According to the sixth or seventh aspect of the present invention, each influence of the inlet gas temperature and the catalyst temperature at the region closer to the catalyst outlet is considered, thereby allowing the catalyst temperature and the inlet gas temperature to be accurately corrected.

According to the eighth aspect of the present invention, the degree of influence is changed based on the operation state of the internal combustion engine, thereby allowing the outlet gas temperature, the catalyst temperature, or the inlet gas temperature to be accurately estimated.

According to the ninth aspect of the present invention, the certain coefficient is changed based on the operation state of the internal combustion engine, thereby allowing the outlet gas temperature to be accurately estimated.

According to the tenth aspect of the present invention, the operation state of the internal combustion engine is appropriately grasped to allow the temperature to be accurately estimated.

BRIEF DESCRIPTION OF DRAWINGS

FIG. 5 is a flowchart of a routine that is executed in the first embodiment of the present invention.

BEST MODE FOR CARRYING OUT THE INVENTION

First Embodiment

[Explanation of System Configuration]

Figure 1:
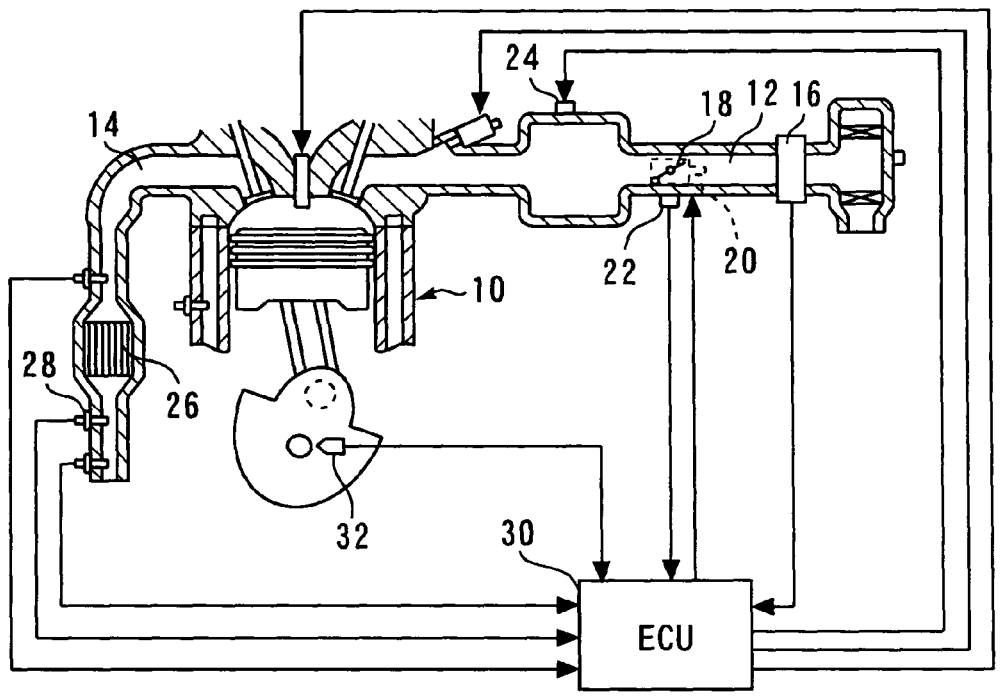
FIG. 1 illustrates a configuration of an internal combustion engine to which an exhaust gas purifying apparatus according to the first embodiment of the present invention is applied.

FIG. 1 illustrates a configuration of an internal combustion engine 10 to which an exhaust gas purifying apparatus according to the first embodiment of the present invention is applied. As shown in FIG. 1, an intake passage 12 and an exhaust passage 14 communicate with the internal combustion engine 10.

In the intake passage 12, an airflow meter 16 is placed for detecting an amount of air flowing through the intake passage 12, that is, an amount of intake air GA flowing into the internal combustion engine 10. Downstream of the airflow meter 16, a throttle valve 18 is placed. The throttle valve 18 is an electronic control valve driven by a throttle motor 20 based on an accelerator opening. Near the throttle valve 18, a throttle position sensor 22 is placed for detecting a throttle opening TA. Downstream of the throttle valve 18, an intake pressure sensor 24 is placed for detecting pressure in the intake passage 12.

In the exhaust passage 14, a catalyst 26 for purifying exhaust gas is placed. Downstream of the catalyst 26, a catalyst temperature sensor 28 is placed for detecting an exhaust gas temperature at the catalyst outlet.

The system according to the embodiment includes an ECU (Electronic Control Unit) 30. To the ECU 30, a crank angle sensor 32 for detecting an engine speed NE is connected besides the above described various sensors. To the ECU 30, an actuator such as the above described throttle valve 18 is also connected.

In the system according to the embodiment thus configured, an estimated value of a temperature (internal temperature) of the catalyst 26 (hereinafter referred to as a "catalyst temperature estimated value") is calculated based on an operation state of the internal combustion engine 10. Also, an estimated value correction amount ecthuf is calculated based on a deviation exthuf between an estimated value ethco of an exhaust gas temperature at an outlet of the catalyst 26 (hereinafter referred to as an "outlet gas temperature") and a measured value of the outlet gas temperature based on an output of the catalyst temperature sensor 28. The estimated value correction amount ecthuf is used to correct the catalyst temperature estimated value.

Features of the First Embodiment

Figure 2:
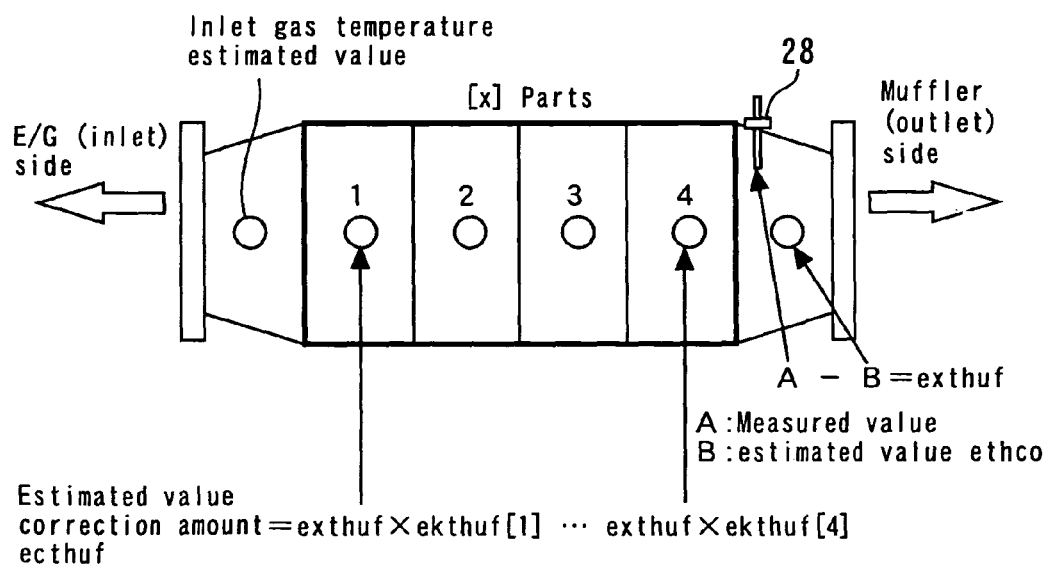
FIG. 2 illustrates an estimation method of the catalyst temperature in the first embodiment of the present invention.

FIG. 2 illustrates an estimation method of the catalyst temperature in the first embodiment. As shown in FIG. 2, in the embodiment, the catalyst 26 is divided into a plurality of parts (four parts in this example) for accurate estimation of the catalyst temperature at each region of the catalyst 26.

In the embodiment, the estimated value ethco of the outlet gas temperature is calculated by the following formula (1) for weighted averaging an exhaust gas temperature at an inlet of the catalyst 26 (hereinafter referred to as an "inlet gas temperature") and a catalyst rear end temperature ethuf[end] considering the influence of the temperatures.

$$ethco = \{\text{inlet gas temperature} \cdot emthc + ethuf[end] \cdot (1-emthc)\} \cdot a \quad (1)$$

where emthc is a weighting factor corresponding to the degree of influence of the inlet gas temperature and the catalyst rear end temperature ethuf[end], and is changed according to the operation state of the internal combustion engine 10. More specifically, the degree of influence emthc is set to be high when the influence of the inlet gas temperature is larger than the influence of the catalyst rear end temperature ethuf[end]. The predetermined coefficient a is also changed according to the operation state of the internal combustion engine 10. In the example in FIG. 2, the catalyst rear end temperature ethuf[end] corresponds to a catalyst temperature at a region closest to the outlet side of the catalyst 26.

Figure 3:
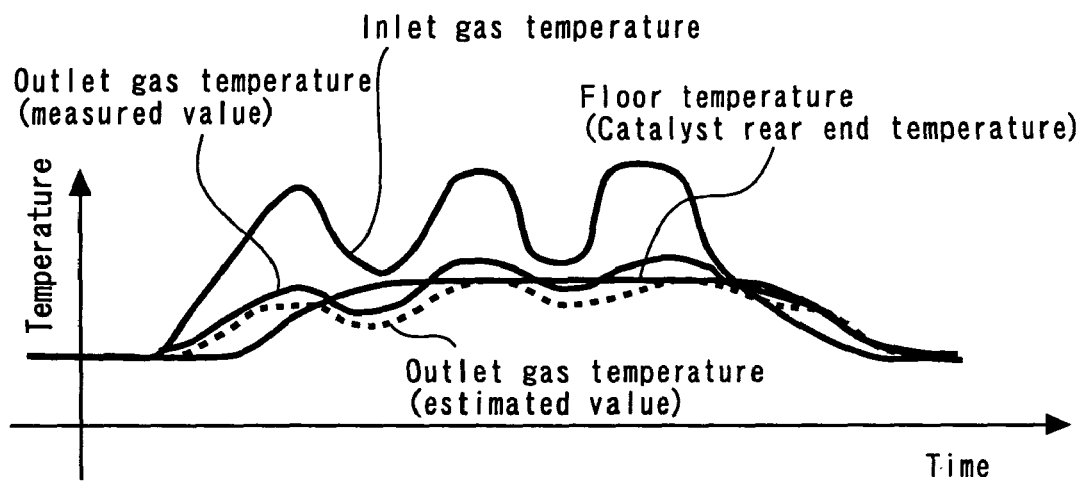
FIG. 3 shows an example of behavior of various temperatures relating to the catalyst in FIG. 2.

FIG. 3 shows an example of behavior of various temperatures relating to the catalyst 26 in FIG. 2. As shown in FIG. 3, the inlet gas temperature of the catalyst 26, which is a gas temperature, changes with changes in the operation state of the internal combustion engine 10 with high response. On the other hand, the catalyst rear end temperature ethuf[end] changes more gently than the inlet gas temperature even if the operation state of the internal combustion engine 10 changes. The measured value of the outlet gas temperature of the catalyst 26 is influenced by the inlet gas temperature and the catalyst rear end temperature ethuf[end], and thus changes according to the operation state of the internal combustion engine 10 around an intermediate value between the temperatures. The waveform shown by the broken line in FIG. 3 shows the estimated value ethco of the outlet gas temperature calculated by the formula (1). With the formula (1), considering the influence of the inlet gas temperature and the catalyst rear end temperature ethuf[end], the outlet gas temperature can be accurately estimated so as to follow the measured value of the outlet gas temperature.

Next, with reference to FIGS. 2 and 4, a correction method of the estimated value correction amount ecthuf for correcting the catalyst temperature estimated value will be described.

In the embodiment, as in the formula (1), the outlet gas temperature estimated value ethco is expressed by a complex value of the inlet gas temperature and the catalyst rear end temperature ethuf[end]. An estimation error of the outlet gas temperature expressed as the deviation exthuf between the outlet gas temperature estimated value ethco and the measured value of the outlet gas temperature becomes large at a region closer to the inlet of the catalyst 26 when the influence of the inlet gas temperature is larger than the influence of the catalyst rear end temperature ethuf[end]. On the other hand, the estimation error becomes large at a region closer to the outlet of the catalyst 26 when the influence of the catalyst rear end temperature ethuf[end] is larger than the influence of the inlet gas temperature.

Thus, if the estimated value correction amount ecthuf is constant at all the regions of the catalyst 26, estimation accuracy of the catalyst temperature estimated value cannot be increased. In the embodiment, as shown in FIG. 2, the estimated value correction amount ecthuf is calculated to be different for each region of the catalyst 26. More specifically, the estimated value correction amount ecthuf is calculated by the following formula (2) using the deviation exthuf and a temperature correction coefficient ekthuf.

$$ecthuf[x]=exthuf \cdot ekthuf[x] \quad (2)$$

where [x] is a numeral indicating the region of the catalyst 26, and corresponds to numbers assigned to the parts of the catalyst 26 in order of 1, 2 ... from the region closer to the inlet of the catalyst 26 in FIG. 2.

Further, in the embodiment, the temperature correction coefficient ekthuf[x] is calculated as a function of the degree of influence emthc, and the temperature correction coefficient ekthuf[x] is changed according to the value of the degree of influence emthc.

Figure 4:
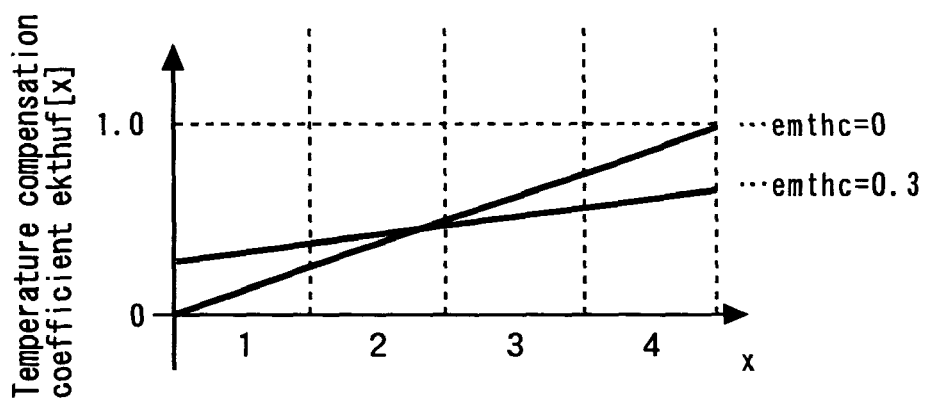
FIG. 4 shows an example of a setting of the temperature correction coefficient ekthuf[x] in the first embodiment of the present invention.

FIG. 4 shows an example of a setting of the temperature correction coefficient ekthuf[x], and shows the tendency of the temperature correction coefficient ekthuf[x] for each region of the catalyst 26. The numbers assigned on the axis of abscissa in FIG. 4 correspond to the numbers assigned to the regions of the catalyst 26 in FIG. 2. FIG. 4 shows the setting of the temperature correction coefficient ekthuf[x] in the case where the degree of influence emthc is 0 and 0.3, respectively.

More specifically, according to the setting in FIG. 4, when the influence of the inlet gas temperature is larger than the influence of the catalyst rear end temperature ethuf[end], that is, when the degree of influence emthc becomes large, the temperature correction coefficient ekthuf[x] at the front of the catalyst is changed to be large and the temperature correction coefficient ekthuf[x] at the rear of the catalyst is changed to be small. On the other hand, when the influence of the catalyst rear end temperature ethuf[end] is larger than the influence of the inlet gas temperature, that is, when the degree of influence emthc becomes small, the temperature correction coefficient ekthuf[x] at the front of the catalyst is changed to be small and the temperature correction coefficient ekthuf[x] at the rear of the catalyst is changed to be large. With such a setting, the temperature estimated value at each region of the catalyst 26 can be accurately calculated considering the influence of the inlet gas temperature and the catalyst rear end temperature ethuf[end].

Detailed Process in the First Embodiment

FIG. 5 is a flowchart of a routine performed by the ECU 30 in the embodiment for correcting the catalyst temperature estimated value with the above described method. In the routine in FIG. 5, first, an intake air amount GA is obtained based on an output of the airflow meter 16 (Step 100).

Then, based on the intake air amount GA obtained in Step 100, the degree of influence emthc is calculated (Step 102). More specifically, for a larger intake air amount GA, a higher degree of influence emthc (0<emthc<1) is calculated. For a larger intake air amount GA, a larger amount of air (exhaust gas) flows to the catalyst 26. That is to say, the influence of the inlet gas temperature becomes larger than the influence of the catalyst rear end temperature ethuf[end]. On the other hand, for a smaller intake air amount GA, a smaller amount of air (exhaust gas) flows to the catalyst 26. That is to say, the influence of the catalyst rear end temperature ethuf[end] becomes larger than the influence of the inlet gas temperature. Thus, according to the processing in Step 102, the degree of influence emthc can be accurately calculated based on the intake air amount GA. The degree of influence emthc is herein changed based on the intake air amount GA, but not limited to the intake air amount GA, the degree of influence emthc may be changed based on, for example, an engine speed NE, a throttle opening TA, a load factor KL, an intake pipe pressure PM, or the like as long as it is a parameter for appropriately grasping the operation state of the internal combustion engine 10.

Next, the estimated value ethco of the outlet gas temperature (estimated outlet gas temperature) is calculated by the formula (1) (Step 104). In Step 104, a value of the predetermined coefficient a in the formula (1) is used that is changed based on a parameter indicating the operation state of the internal combustion engine 10 such as an intake air amount GA, an engine speed NE, a throttle opening TA, a load factor KL, or an intake pipe pressure PM. The inlet gas temperature is herein calculated as an estimated value estimated based on the operation state of the internal combustion engine 10. However, not limited to this, the inlet gas temperature may be obtained by providing a temperature sensor at the inlet of the catalyst 26 in the exhaust passage 14 and measuring the temperature. The catalyst rear end temperature (floor temperature) ethuf[end] is also an estimated value estimated based on the operation state of the internal combustion engine 10.

Next, a deviation (outlet gas temperature error) exthuf between the outlet gas temperature estimated value ethco and the measured value of the outlet gas temperature is calculated as a value obtained by subtracting the measured value of the outlet gas temperature (measured outlet gas temperature) from the outlet gas temperature estimated value ethco calculated in Step 104 (Step 106).

Next, a temperature correction coefficient ekthuf[x] for each region (each cell) of the catalyst 26 is calculated as a function f(emthc) of the degree of influence emthc (Step 108). Specifically, the temperature correction coefficient ekthuf[x] is calculated based on the setting in FIG. 4.

Then, by the formula (2), an estimated value correction amount (compensation temperature) ecthuf[x] for each region (each cell) of the catalyst 26 is calculated (Step 110). Then, a catalyst temperature estimated value (estimated floor temperature) is calculated based on the operation state of the internal combustion engine 10 (Step 112). Then, the estimated value correction amount ecthuf[x] calculated in Step 110 is added to the catalyst temperature estimated value calculated in Step 112 (Step 114).

According to the above described routine in FIG. 5, the outlet gas temperature estimated value ethco and the catalyst temperature estimated value are calculated considering the degree of influence emthc of the inlet gas temperature and catalyst rear end temperature ethuf[end], thereby allowing the estimated values to be accurately obtained and increasing robustness of temperature estimation. In the routine, the temperature correction coefficient ekthuf[x] is changed for each region of the catalyst 26 considering the degree of influence emthc. Thus, the catalyst temperature estimated value for each region of the catalyst 26 can be accurately obtained. Therefore, an activation state of the catalyst 26 can be clarified because internal temperature distribution of the catalyst 26 according to the operation state of the internal combustion engine 10 can be accurately predicted. And harmful components of the exhaust gas can be reduced by being combined with control of an air/fuel ratio using the entire catalyst from an upstream side to a downstream side.

In the first embodiment described above, the catalyst temperature estimated value is corrected based on the estimated value correction amount ecthuf calculated by the formula (2), but a value corrected using the outlet gas temperature estimated value ethco considering the degree of influence emthc of the inlet gas temperature and catalyst rear end temperature ethuf[end] is not limited to the catalyst temperature estimated value. Specifically, the outlet gas temperature estimated value ethco may be used to correct the estimated value of the inlet gas temperature of the catalyst 26.

Specifically, in a step similar to Step 108 in FIG. 5, the degree of influence emthc may be set for each region of the catalyst 26 including the inlet portion of the catalyst 26, and a temperature correction coefficient ekthuf of the inlet gas temperature may be calculated as, for example, ekthuf[0] based on a function F(emthc) of the degree of influence emthc thus set. Then, in a step similar to Step 110, the temperature correction coefficient ekthuf[0] may be used to calculate an estimated value correction amount ecthuf[0] for an inlet gas temperature estimated value. Then, in a step similar to Step 114, the estimated value correction amount ecthuf[0] may be added to the separately calculated inlet gas temperature estimated value.

In the first embodiment, which has been described above, the "inlet gas temperature obtaining means" according to the first aspect of the present invention is implemented when the ECU 30 obtains the estimated value of the inlet gas temperature by performing step 104; the "catalyst temperature estimating means" according to the first aspect of the present invention is implemented when the ECU 30 obtains the catalyst rear end temperature (floor temperature) ethuf[end] by performing step 104 or performs step 112; and the "outlet gas temperature estimating means" according to the first aspect of the present invention is implemented when the ECU 30 performs step 104.

Further, The "temperature correcting means" according to the third aspect of the present invention is implemented when ECU 30 performs a series of processes in the routine shown in FIG. 5.

Further, The "outlet gas temperature measuring means" according to the fourth aspect of the present invention is implemented when ECU 30 obtains the measured value of the outlet gas temperature by performing step 106.

Further, The "influence degree changing means" according to the eighth aspect of the present invention is implemented when ECU 30 performs step 102.

Further, The "coefficient changing means" according to the ninth aspect of the present invention is implemented when ECU 30 obtains the predetermined coefficient α based on the operating state of the internal combustion engine 10 by performing step 104.

The invention claimed is:

1. An exhaust gas purifying apparatus for an internal combustion engine, comprising:
    a catalyst that is placed in an exhaust passage of the internal combustion engine;
    inlet gas temperature obtaining means for obtaining an inlet gas temperature of an exhaust gas at a catalyst inlet;
    catalyst temperature estimating means for estimating a catalyst temperature of the catalyst;
    outlet gas temperature estimating means for estimating an outlet gas temperature of the exhaust gas at a catalyst outlet considering a degree of influence of the inlet gas temperature and a catalyst temperature at a region closer to the catalyst outlet; and
    temperature correcting means for correcting an estimated value of the catalyst temperature estimated by the catalyst temperature estimating means on the basis of an estimated value of the outlet gas temperature estimated by the outlet gas temperature estimating means,
    wherein the temperature correcting means determines an estimated value correction amount of the estimated value of the catalyst temperature at each region of the catalyst divided into a plurality of parts on the basis of the degree of influence.

2. The exhaust gas purifying apparatus for the internal combustion engine according to claim 1, wherein the outlet gas temperature estimating means estimates a value, as the outlet gas temperature, which is obtained by multiplying a weighted average value between the inlet gas temperature and the catalyst temperature considering the degree of influence by a certain coefficient.

3. The exhaust gas purifying apparatus for the internal combustion engine according to claim 1, further comprising:
    outlet gas temperature measuring means for measuring the outlet gas temperature,
    wherein the temperature correcting means corrects the estimated value of the catalyst temperature on the basis of the estimated value and measured value of the outlet gas temperature.

4. The exhaust gas purifying apparatus for the internal combustion engine according to claim 2, further comprising:
   outlet gas temperature measuring means for measuring the outlet gas temperature,
   wherein the temperature correcting means corrects the estimated value of the inlet gas temperature on the basis of the estimated value and measured value of the outlet gas temperature.

5. The exhaust gas purifying apparatus for the internal combustion engine according to claim 2,
   wherein the catalyst temperature estimation means estimates the catalyst temperature at each region of the catalyst divided into a plurality of parts,
   wherein the temperature correcting means dissimilates the estimated value correction amount of the inlet gas temperature estimated value for each region of the catalyst by dissimilating the degree of influence for each region of the catalyst which includes or excludes the inlet portion of the catalyst.

6. The exhaust gas purifying apparatus for the internal combustion engine according to claim 1,
   wherein the temperature correcting means corrects the estimated value correction amount at a region closer to the inlet of the catalyst largely and corrects the estimated value correction amount at a region closer to the outlet of the catalyst small, as the influence of the inlet gas temperature becomes larger than the influence of the catalyst temperature at the region closer to the outlet of the catalyst.

7. The exhaust gas purifying apparatus for the internal combustion engine according to claim 1,
   wherein the temperature correcting means corrects the estimated value correction amount at a region closer to the inlet of the catalyst small and corrects the estimated value correction amount at a region closer to the outlet of the catalyst largely, as the influence of the catalyst temperature at the region closer to the outlet of the catalyst becomes larger than the influence of the inlet gas temperature.

8. The exhaust gas purifying apparatus for the internal combustion engine according to claim 1,
   wherein the outlet gas temperature estimating means and/or temperature correcting means further includes influence degree changing means for changing the degree of influence on the basis of an operating state of the internal combustion engine.

9. The exhaust gas purifying apparatus for the internal combustion engine according to claim 2,
   wherein the outlet gas temperature estimating means further includes coefficient changing means for changing the certain coefficient on the basis of an operating state of the internal combustion engine.

10. The exhaust gas purifying apparatus for the internal combustion engine according to claim 8,
    wherein a parameter indicating the operating state is at least one of an intake air amount, a crankshaft rotating speed, an intake pipe pressure, a throttle opening, and a load factor.

11. An exhaust gas purifying apparatus for an internal combustion engine, comprising:
    a catalyst that is placed in an exhaust passage of the internal combustion engine;
    inlet gas temperature obtaining means for obtaining an inlet gas temperature of an exhaust gas at a catalyst inlet;
    catalyst temperature estimating means for estimating a temperature of the catalyst;
    outlet gas temperature estimating means for estimating an outlet gas temperature of the exhaust gas at a catalyst outlet considering a degree of influence of the inlet gas temperature and a catalyst temperature at a region closer to the catalyst outlet; and
    temperature correcting means for correcting an estimated value of the inlet gas temperature estimated by the inlet gas temperature obtaining means on the basis of the estimated value of the outlet gas temperature estimated by the outlet gas temperature estimating means.

12. The exhaust gas purifying apparatus for the internal combustion engine according to claim 11,
    wherein the outlet gas temperature estimating means estimates a value, as the outlet gas temperature, which is obtained by multiplying a weighted average value between the inlet gas temperature and the catalyst temperature considering the degree of influence by a certain coefficient.

13. The exhaust gas purifying apparatus for the internal combustion engine according to claim 12, further comprising:
    outlet gas temperature measuring means for measuring the outlet gas temperature,
    wherein the temperature correcting means corrects the estimated value of the catalyst temperature on the basis of the estimated value and measured value of the outlet gas temperature.

14. The exhaust gas purifying apparatus for the internal combustion engine according to claim 11, further comprising:
    outlet gas temperature measuring means for measuring the outlet gas temperature,
    wherein the temperature correcting means corrects the estimated value of the inlet gas temperature on the basis of the estimated value and measured value of the outlet gas temperature.

15. The exhaust gas purifying apparatus for the internal combustion engine according to claim 11,
    wherein the catalyst temperature estimation means estimates the catalyst temperature at each region of the catalyst divided into a plurality of parts,
    wherein the temperature correcting means dissimilates the estimated value correction amount of the inlet gas temperature estimated value for each region of the catalyst by dissimilating the degree of influence for each region of the catalyst which includes or excludes the inlet portion of the catalyst.

16. The exhaust gas purifying apparatus for the internal combustion engine according to claim 11,
    wherein the temperature correcting means corrects the estimated value correction amount at a region closer to the inlet of the catalyst largely and corrects the estimated value correction amount at a region closer to the outlet of the catalyst small, as the influence of the inlet gas temperature becomes larger than the influence of the catalyst temperature at the region closer to the outlet of the catalyst.

17. The exhaust gas purifying apparatus for the internal combustion engine according to claim 11,
    wherein the temperature correcting means corrects the estimated value correction amount at a region closer to the inlet of the catalyst small and corrects the estimated value correction amount at a region closer to the outlet of the catalyst largely, as the influence of the catalyst temperature at the region closer to the outlet of the catalyst becomes larger than the influence of the inlet gas temperature.

18. The exhaust gas purifying apparatus for the internal combustion engine according to claim 11,
wherein the outlet gas temperature estimating means and/or temperature correcting means further includes influence degree changing means for changing the degree of influence on the basis of an operating state of the internal combustion engine.

19. The exhaust gas purifying apparatus for the internal combustion engine according to claim 12,
wherein the outlet gas temperature estimating means further includes coefficient changing means for changing the certain coefficient on the basis of an operating state of the internal combustion engine.

20. The exhaust gas purifying apparatus for the internal combustion engine according to claim 18,
wherein a parameter indicating the operating state is at least one of an intake air amount, a crankshaft rotating speed, an intake pipe pressure, a throttle opening, and a load factor.

21. An exhaust gas purifying apparatus for an internal combustion engine, comprising:
a catalyst that is placed in an exhaust passage of the internal combustion engine;
an inlet gas temperature obtaining unit for obtaining an inlet gas temperature of an exhaust gas at a catalyst inlet;
a catalyst temperature estimating unit for estimating a catalyst temperature of the catalyst;
an outlet gas temperature estimating unit for estimating an outlet gas temperature of the exhaust gas at a catalyst outlet considering a degree of influence of the inlet gas temperature and a catalyst temperature at a region closer to the catalyst outlet; and
a temperature correcting unit for correcting an estimated value of the catalyst temperature estimated by the catalyst temperature estimating unit on the basis of an estimated value of the outlet gas temperature estimated by the outlet gas temperature estimating unit,
wherein the temperature correcting unit determines an estimated value correction amount of the estimated value of the catalyst temperature at each region of the catalyst divided into a plurality of parts on the basis of the degree of influence.

22. An exhaust gas purifying apparatus for an internal combustion engine, comprising:
a catalyst that is placed in an exhaust passage of the internal combustion engine;
an inlet gas temperature obtaining unit for obtaining an inlet gas temperature of an exhaust gas at a catalyst inlet;
a catalyst temperature estimating unit for estimating a temperature of the catalyst;
an outlet gas temperature estimating unit for estimating an outlet gas temperature of the exhaust gas at a catalyst outlet considering a degree of influence of the inlet gas temperature and a catalyst temperature at a region closer to the catalyst outlet; and
a temperature correcting unit for correcting an estimated value of the inlet gas temperature estimated by the inlet gas temperature obtaining unit on the basis of the estimated value of the outlet gas temperature estimated by the outlet gas temperature estimating unit.

* * * * *